(12) United States Patent
Hoover

(10) Patent No.: US 11,618,573 B2
(45) Date of Patent: Apr. 4, 2023

(54) AUTOMATIC LIFTING MECHANISM FOR AIRCRAFT ARMREST

(71) Applicant: AMI Industries, Inc., Colorado Springs, CO (US)

(72) Inventor: Douglas E. Hoover, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 142 days.

(21) Appl. No.: 17/162,324

(22) Filed: Jan. 29, 2021

(65) Prior Publication Data

US 2021/0269159 A1 Sep. 2, 2021

Related U.S. Application Data

(60) Provisional application No. 62/982,497, filed on Feb. 27, 2020.

(51) Int. Cl.
*B64D 11/06* (2006.01)
(52) U.S. Cl.
CPC .... *B64D 11/0644* (2014.12); *B64D 11/06395* (2014.12)

(58) Field of Classification Search
CPC ............. B64D 11/064; B64D 11/0644; B64D 11/06395
See application file for complete search history.

(56) References Cited

U.S. PATENT DOCUMENTS

| | | | |
|---|---|---|---|
| 3,580,636 A * | 5/1971 | Setto .................. | B64D 11/0644 244/234 |
| 10,279,917 B1 * | 5/2019 | Wilkey .............. | B64D 11/0644 |
| 10,836,494 B2 * | 11/2020 | Wilkey .............. | B64D 11/0644 |
| 2015/0175039 A1 * | 6/2015 | Jarardi .................. | B60N 2/4207 297/216.1 |
| 2018/0312084 A1 * | 11/2018 | Does .................... | B64D 11/064 |

\* cited by examiner

*Primary Examiner* — Anthony D Barfield
(74) *Attorney, Agent, or Firm* — Suiter Swantz pc llo

(57) ABSTRACT

An aircraft armrest lifting mechanism generally biases the aircraft armrest toward a raised configuration. A linear actuator applies tension to a cable connected to a portion of an armrest hub connected to an armrest shaft. The portion of the armrest hub extends some distance from the armrest shaft so that the linear actuator applies a moment between an attachment point on the armrest and the armrest shaft that tends to rotate the armrest toward a raised configuration.

15 Claims, 4 Drawing Sheets

AUTOMATIC LIFTING MECHANISM FOR AIRCRAFT ARMREST

PRIORITY

The present application claims the benefit under 35 U.S.C. § 119(e) of U.S. Provisional App. No. 62/982,497 (filed Feb. 27, 2020), which is incorporated herein by reference.

BACKGROUND

Aircraft armrests are often inconvenient and obtrusive. Especially when getting in an out of an aircraft seat, armrests can be obstructive and even dangerous. Furthermore, in turbulent weather, existing armrests can fall down from an upright/stowed position which can further endanger crewmembers. It would be advantageous to have a mechanism for automatically biasing an armrest toward a upright/stowed orientation.

SUMMARY

In one aspect, embodiments of the inventive concepts disclosed herein are directed to an aircraft armrest lifting mechanism that generally biases the aircraft armrest toward a raised configuration. A linear actuator applies tension to a cable connected to a portion of an armrest hub connected to an armrest shaft. The portion of the armrest hub extends some distance from the armrest shaft so that the linear actuator applies a moment between an attachment point on the armrest and the armrest shaft that tends to rotate the armrest toward a raised configuration.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1A:
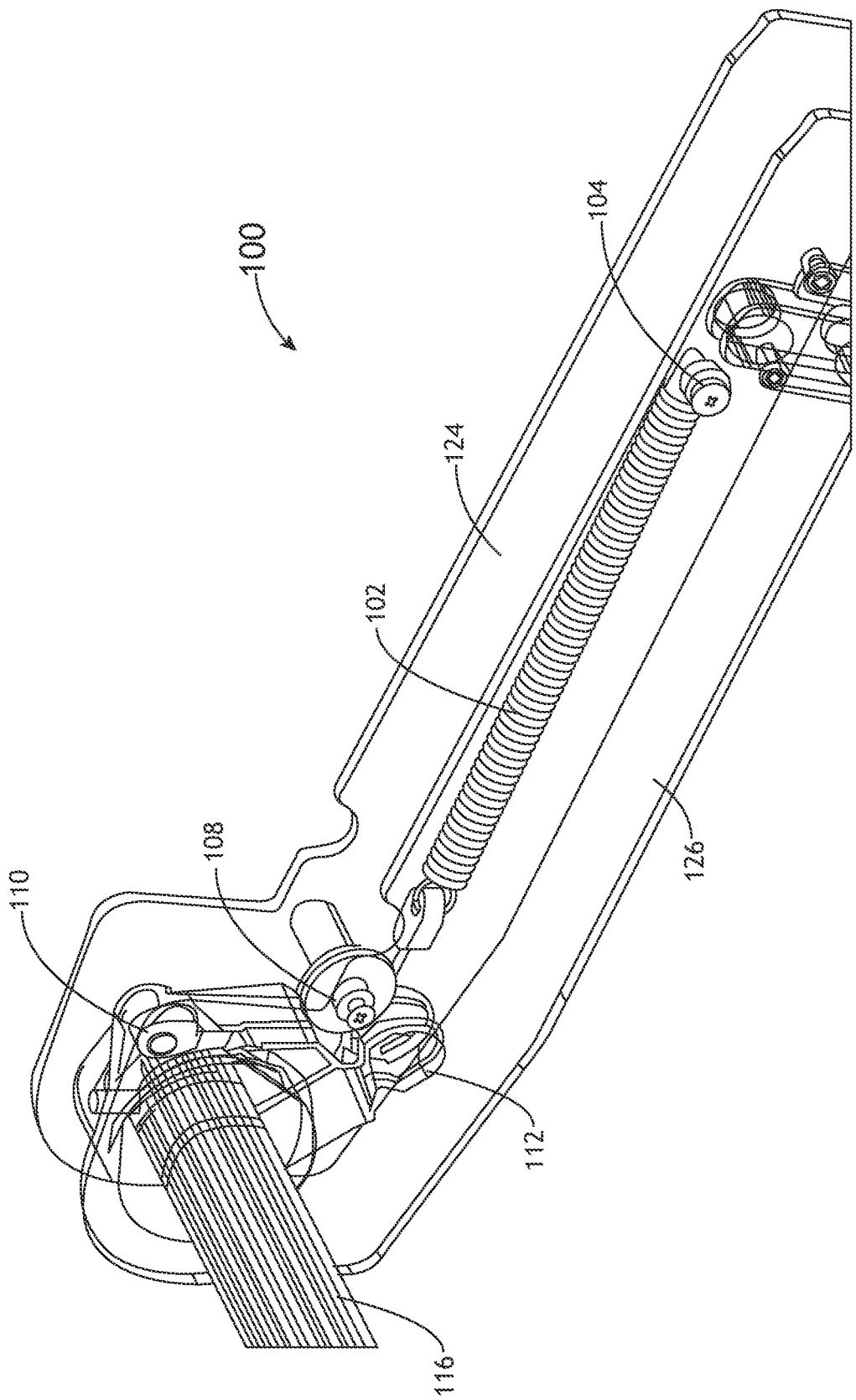
FIG. 1A shows a perspective view of an exemplary embodiment of an armrest lifting mechanism in a lowered configuration.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to an aircraft armrest lifting mechanism that generally biases the aircraft armrest toward a raised configuration. A linear actuator applies tension to a cable connected to a portion of an armrest hub connected to an armrest shaft. The portion of the armrest hub extends some distance from the armrest shaft so that the linear actuator applies a moment between an attachment point on the armrest and the armrest shaft that tends to rotate the armrest toward a raised configuration.

Figure 1B:
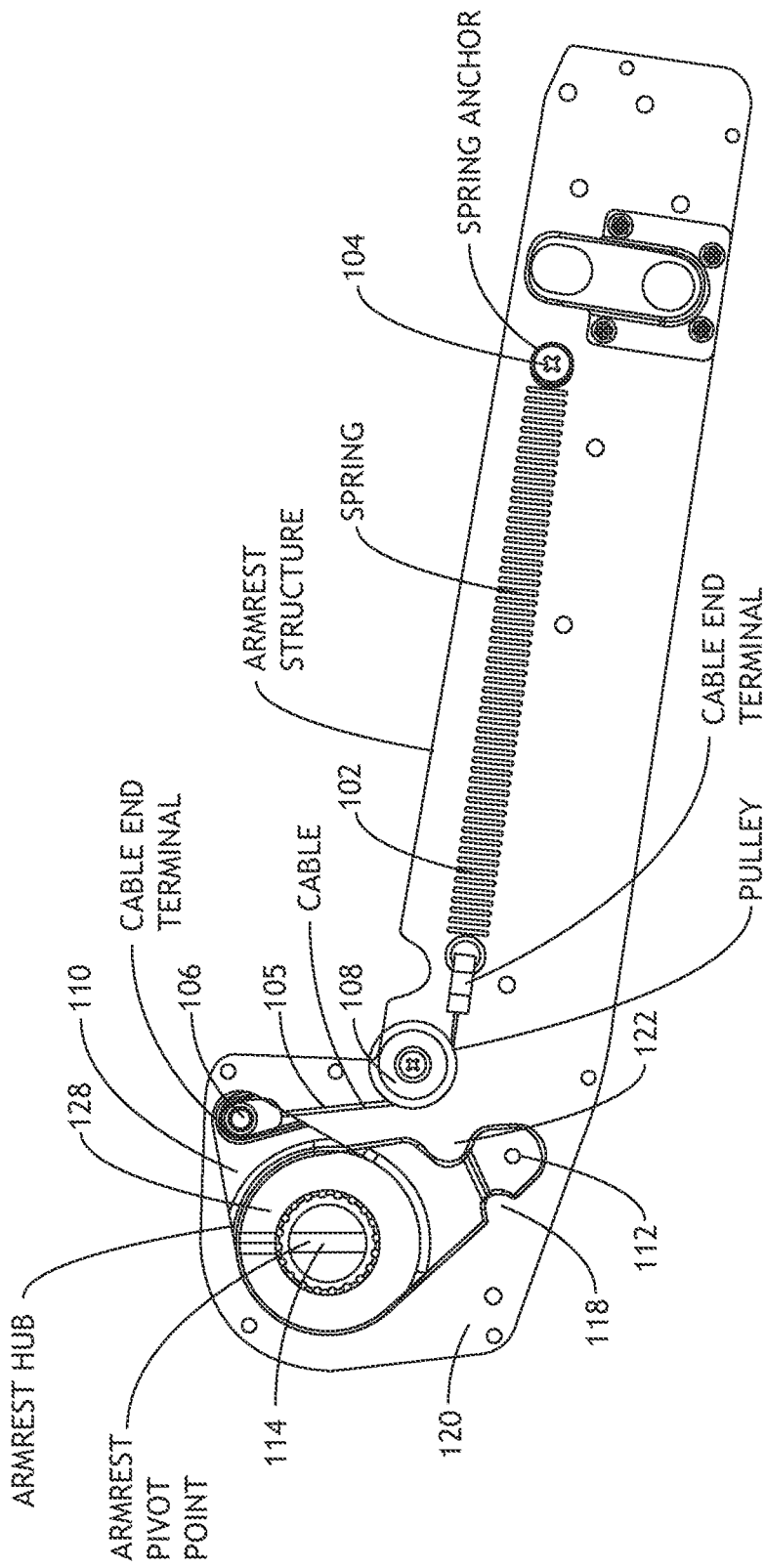
FIG. 1B shows a side view of an exemplary embodiment of an armrest lifting mechanism in a lowered configuration.

Referring to FIGS. 1A-1B, perspective and side views of an exemplary embodiment of an armrest lifting mechanism in a lowered configuration are shown. An armrest lifting mechanism disposed within an armrest 100 includes a linear actuator 102 such a spring or pneumatic cylinder. The linear actuator 102 is attached to a surface of the armrest at a distal anchor point 104. A cable 105 connects the linear actuator 102 to an actuator connection portion 106 of an armrest hub 110. In at least one embodiment, the cable 105 is disposed partially around a deflection element 108 that constrains the linear actuator 102 to a linear path within the armrest 100, and helps define the moment applied to the armrest 100 by the linear actuator 102 by constraining the direction of the force applied by the linear actuator 102 to the armrest hub 110 (and thereby minimize any component of that force not applied to rotation). In at least one embodiment, the deflection element 108 comprises a pulley to facilitate movement of the cable 105.

In at least one embodiment, the armrest hub 110 comprises a rotation limiting arm 112 that constrains rotation of the armrest 100 with respect to the armrest hub 110. In at least one embodiment, the rotation limiting arm 112 may define a pin recess 118 configured to abut an armrest pin 120 and prevent further downward rotation of the armrest 100 with respect to the armrest hub 110. Likewise, in at least one embodiment, the rotation limiting arm 112 may define a deflection element recess 122 configured to abut deflection element 108 and prevent further upward rotation of the armrest 100 with respect to the armrest hub 110. The rotation limiting arm 112 may not necessarily constrain rotation of the armrest 100 and armrest hub 110 together as described more fully herein.

In at least one embodiment, the armrest hub 110 is affixed to an armrest shaft 116 via an armrest limit stop pin 114. In at least one embodiment, the armrest limit stop pin 114 is secured to the armrest shaft 116 and the armrest hub 110 defines an armrest limit stop pin channel 128 where the armrest limit stop pin 114 is disposed. In such embodiments, the armrest hub 110 may rotate about the armrest shaft 116 within a limited range defined by the armrest limit stop pin 114 and armrest limit stop pin channel 128. In such embodiments, the armrest 100 has a range of movement within an absolute lower bound and an absolute upper bound. Within that range, the armrest 100 may have a generally neutral bias between the upper bound and a point where the armrest limit stop pin channel 128 abuts the armrest limit stop pin 114; between that point and the lower bound, the armrest 100 experiences a generally increasing bias toward an upward orientation as the linear actuator 102 is deflected and applies more and more tension to the cable 105.

In at least one embodiment, the armrest 100 is defined by exterior housing components 124, 126, with the armrest lifting mechanism contained completely within those housing components 124, 126. The linear actuator 102 and actuator connection portion 106 of the armrest hub 110 are disposed proximal to a first housing component 126 to maximize available space within the armrest 100.

Figure 2A:
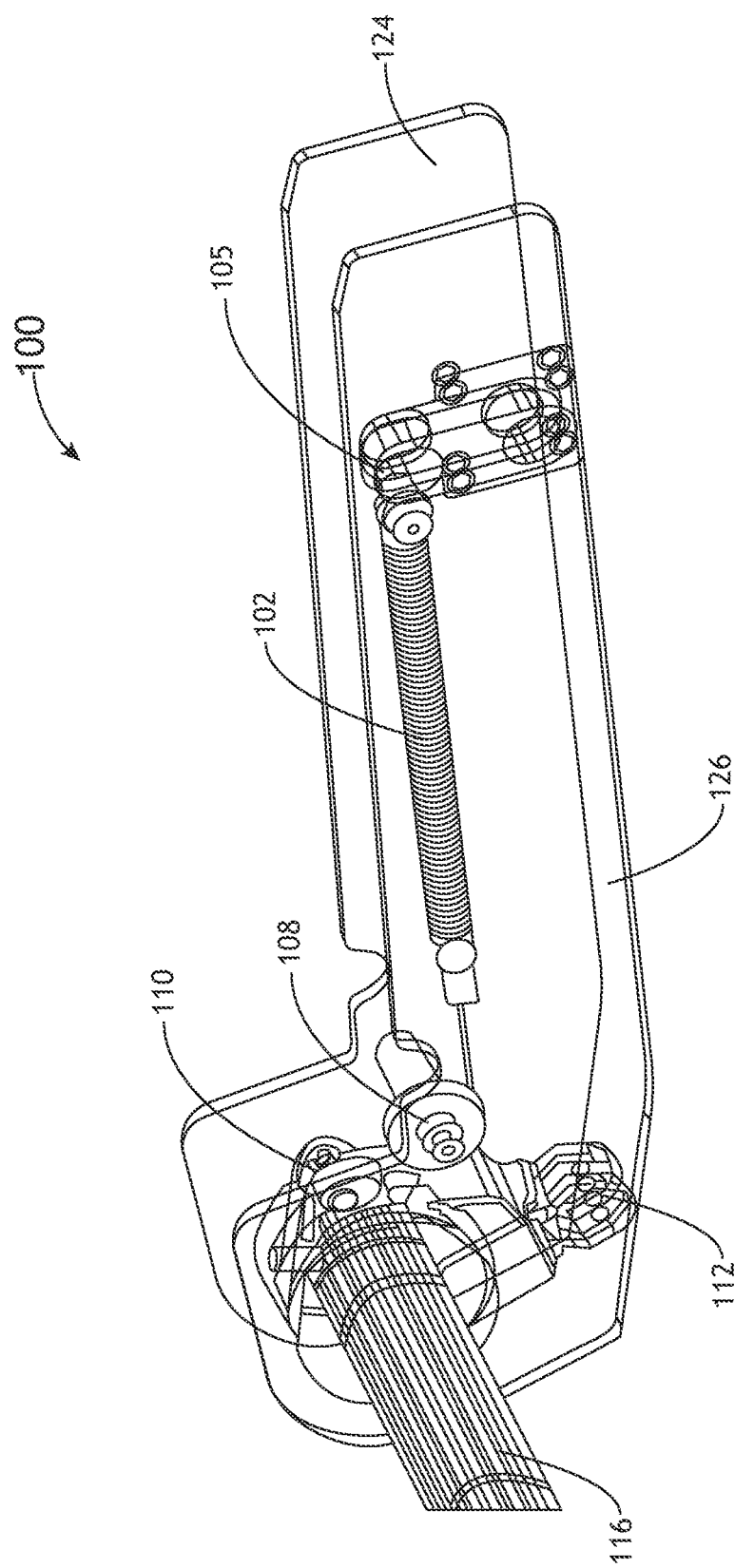
FIG. 2A shows a perspective view of an exemplary embodiment of an armrest lifting mechanism in a raised configuration.
Figure 2B:
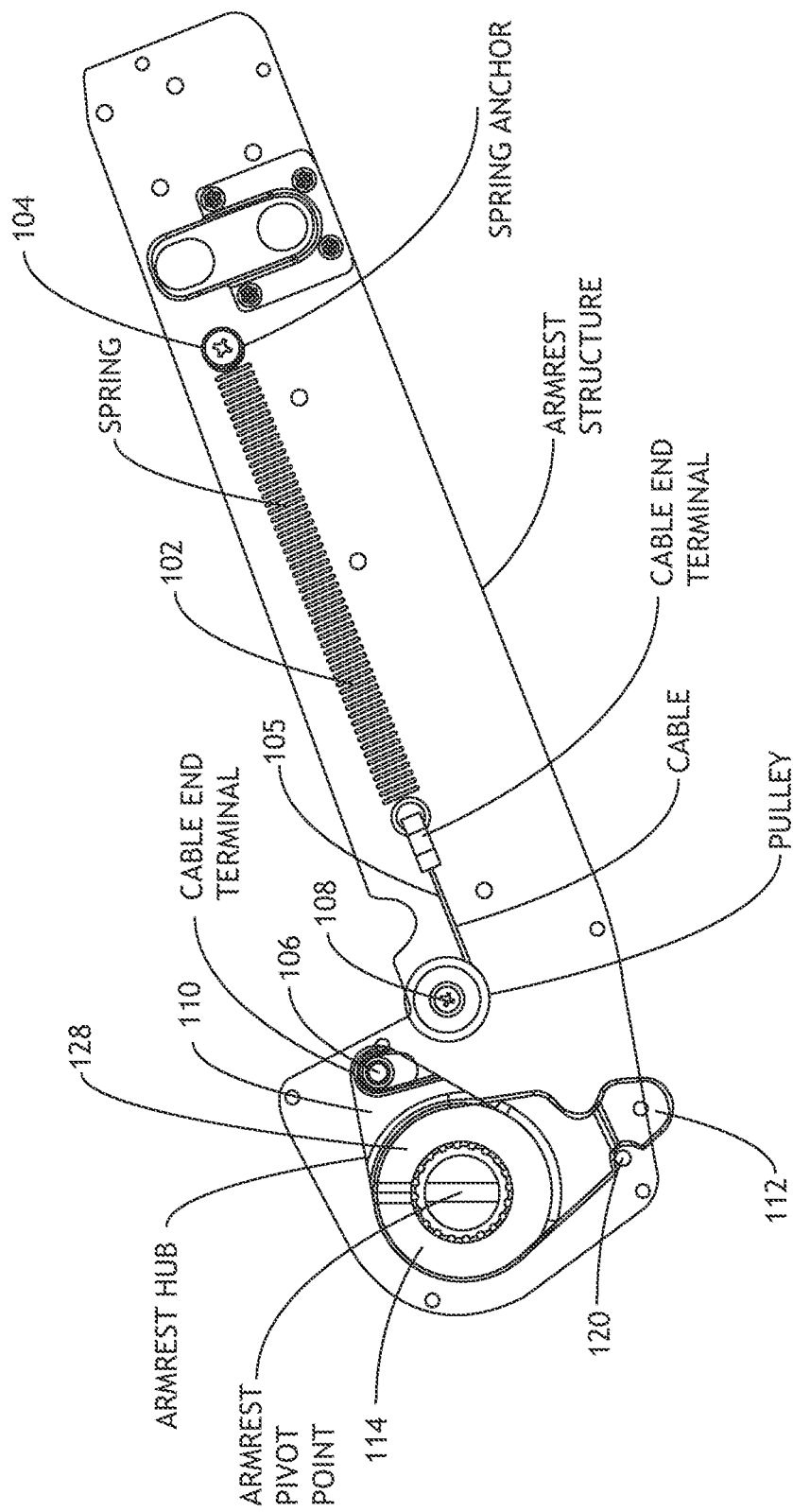
FIG. 2B shows a side view of an exemplary embodiment of an armrest lifting mechanism in a raised configuration.

Referring to FIGS. 2A-2B, perspective and side views of an exemplary embodiment of an armrest lifting mechanism in a raised configuration are shown. When the armrest 100 is not actively being pushed down, the linear actuator 102 tends to apply a tensioning force to the cable 105 which is translated to rotational force applied to the armrest hub 110 via the actuator connection portion 106. The rotational force tends to bias the armrest 100 toward a raised or partially raised orientation. In at least one embodiment, the rotational force to the armrest hub 110 is translated to the armrest shaft 116 via the armrest limit stop pin 114.

In at least one embodiment, beyond a certain limit, armrest 100 may be prevented from rotating with respect to the armrest hub 110, for example by the interaction of a rotation limiting arm 112 and armrest pin 120. Beyond that limit, the combined armrest 100 and armrest hub 110 may further rotate with respect to the armrest shaft 116 via the movement of an armrest limit stop pin 114 within the armrest limit stop pin channel 128 defined by the armrest hub 110. In such embodiments, while the armrest 100 can continue to rotate, the linear actuator 102 does not bias the armrest 100 upward beyond that limit.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. An armrest lifting apparatus comprising:
a linear actuator;
a tension cable; and
an armrest hub comprising an actuator connection portion some distance from a center of rotation of the armrest hub,
wherein:
the linear actuator is affixed to a surface of an armrest;
the armrest hub is affixed to an armrest shaft;
the actuator connection portion extends a distance from the armrest shaft;
the tension cable connects the linear actuator to the actuator connection portion of the armrest hub; and
the linear actuator and armrest hub are disposed to apply a force moment of rotation to the armrest hub and armrest that biases the armrest to rotate toward a raised orientation.

2. The armrest lifting apparatus of claim 1, wherein the linear actuator comprises a spring.

3. The armrest lifting apparatus of claim 1, further comprising a deflection element disposed on the surface of the armrest, the deflection element configured to deflect the cable from the linear actuator to the actuator connection portion.

4. The armrest lifting apparatus of claim 3, wherein the deflection element comprises a pulley.

5. The armrest lifting apparatus of claim 1, further comprising an armrest limit stop pin connecting the armrest hub to the armrest shaft.

6. The armrest lifting apparatus of claim 5, wherein:
the armrest hub defines an armrest limit stop pin channel;
the armrest limit stop pin channel defines a range of movement of the armrest hub with respect to the armrest shaft; and
the armrest hub is rotatably affixed to the armrest shaft within the range of movement.

7. The armrest lifting apparatus of claim 1, wherein the armrest hub further comprises a rotation limiting arm, the rotation limiting arm defining a pin recess configured to abut a pin in the armrest when the armrest is rotated a defined amount with respect to the armrest hub.

8. The armrest lifting apparatus of claim 7, further comprising a deflection element disposed on the surface of the armrest, wherein:
the rotation limiting arm further defines a deflection element recess; and the deflection element recess is configured to abut the deflection element and define a maximum amount or armrest rotation.

9. An aircraft armrest comprising:
an armrest shaft connecting the aircraft armrest to a seat structure; and
an armrest lifting apparatus comprising:
  a linear actuator;
  a tension cable; and
  an armrest hub comprising an actuator connection portion some distance from a center of rotation of the armrest hub,
wherein:
  the linear actuator is affixed to a surface of aircraft armrest;
  the armrest hub is affixed to the armrest shaft;
  the actuator connection portion extends a distance from the armrest shaft;
  the tension cable connects the linear actuator to the actuator connection portion of the armrest hub; and
  the linear actuator and armrest hub are disposed to apply a moment of rotation to the armrest hub and armrest that biases the aircraft armrest to rotate toward a raised orientation.

10. The aircraft armrest of claim 9, further comprising a deflection element disposed on the surface of the armrest, the deflection element configured to deflect the cable from the linear actuator to the actuator connection portion.

11. The aircraft armrest of claim 10, wherein the deflection element comprises a pulley.

12. The aircraft armrest of claim 9, further comprising an armrest limit stop pin connecting the armrest hub to the armrest shaft.

13. The aircraft armrest of claim 12, wherein:
the armrest hub defines an armrest limit stop pin channel;
the armrest limit stop pin channel defines a range of movement of the armrest hub with respect to the armrest shaft; and
the armrest hub is rotatably affixed to the armrest shaft within the range of movement.

14. The aircraft armrest of claim 9, wherein the armrest hub further comprises a rotation limiting arm, the rotation limiting arm defining a pin recess configured to abut a pin in the armrest when the armrest is rotated a defined amount with respect to the armrest hub.

15. The aircraft armrest of claim 14, further comprising a deflection element disposed on the surface of the armrest, wherein:
the rotation limiting arm further defines a deflection element recess; and
the deflection element recess is configured to abut the deflection element and define a maximum amount or armrest rotation.

* * * * *